Oct. 14, 1969  N. O. ROSAEN  3,472,380
BIDIRECTIONAL FILTER DEVICE
Filed Dec. 27, 1966  2 Sheets-Sheet 1

INVENTOR
NILS O. ROSAEN
BY Hauke, Krass, & Gifford
ATTORNEYS

Oct. 14, 1969    N. O. ROSAEN    3,472,380
BIDIRECTIONAL FILTER DEVICE
Filed Dec. 27, 1966    2 Sheets-Sheet 2

INVENTOR
NILS O. ROSAEN

BY Hauke, Kress, & Gifford
ATTORNEYS

United States Patent Office 3,472,380
Patented Oct. 14, 1969

3,472,380
BIDIRECTIONAL FILTER DEVICE
Nils O. Rosaen, Hazel Park, Mich., assignor, by mesne assignments, to Parker-Hannifin Corporation, Cleveland, Ohio, a corporation of Ohio
Filed Dec. 27, 1966, Ser. No. 605,019
Int. Cl. B01d 35/14, 35/00
U.S. Cl. 210—90                                           6 Claims

ABSTRACT OF THE DISCLOSURE

A filter device for bidirectional fluid systems having a single axially slidably mounted filter element movable in response to changes in the filter condition, having check valve means for insuring fluid flow through the device in the proper direction, and indicating means for indicating the condition of the filter element regardless of the direction of fluid flow through the device.

Background of the invention

With fluid filters and other fluid treating devices which are designed for unidirectional fluid flow their use in fluid systems having reverse flow characteristics such as certain hydraulic control systems and the like is often impractical or complicated. Heretofore fluid filtering devices for such systems have usually employed a dual filter element arrangement so that fluid flowing in one direction is directed through one of the elements and when the fluid flow direction changes the other element is employed for filtering the fluid. The reason for such an arrangement is that if one element is employed some means must be provided for passing the fluid through the filter element in the same direction regardless of the direction of the fluid flow through the device. For otherwise fluid flowing in one direction through the element would backflush the foreign particles trapped by the element during fluid flow in the reverse direction and these foreign particles would be swept back into the fluid each time the direction of the fluid flow is reversed. Another reason that a single element has not been heretofore provided is the difficulty encountered in attempting to provide indicating means which would indicate accurately the condition of the filter element regardless of the direction of flow through the filter device. The usual solution to this problem has been to provide two filter elements with an indicating means for each filter element.

While such solutions are generally satisfactory they substantially double the cost of providing filtering in such systems where bidirectional flow is utilized. Further, in many systems space is limited and this means that with two filter elements the maximum filtering area which can be utilized is substantially half that which would be possible if a single filter element could be used.

Brief summary of the invention

The present invention provides a filter device for use in bi-directional flow fluid systems and which employs a single filter element. Check valves are utilized in the filter device for directing the fluid to the filter element in the same direction regardless of the direction of fluid through the filter device. Further, the filter element is axially movable within the filter device to axial positions which depend upon the clogged condition of the filter element.

It is an object of the present invention to reduce the cost and space requirements for filtering devices in bi-directional flow fluid systems by providing such a filter device utilizing a single filter element and an indicating means operable to indicate the condition of the filter element regardless of the direction of flow through the filter device.

Brief description of the drawings

Other objects and advantages of the present invention will readily occur to one skilled in the art to which the invention pertains upon reference to the accompanying drawings illustrating a preferred embodiment of the invention in wihch like reference characters refer to like parts throughout the several views and in which.

Detailed description of the preferred embodiment

Figure 7:
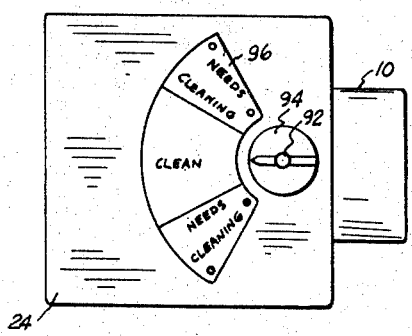
FIGURE 7 is a top plan view of the device shown in FIGURE 1.

Now referring to the drawings for a more detailed description of the present invention, a preferred embodiment thereof is illustrated as comprising a housing 10 defining a substantially cylindrical chamber 12. The housing 10 is provided adjacent its upper end with a pair of radially extending ports 14 and 16. The port 14 opens directly to the upper end of the chamber 12 while the port 16 registers with an elongated passage 18 formed in the housing 10 and registering with the chamber 12 adjacent the lower end thereof. The lower end of the chamber 12 is closed by an end cap 20 mounted to the end of the housing 10 by screws or the like (not shown) which with the aid of an O-ring seal 22 carried between the end cap 20 and the end of the housing 10 provides a fluid tight connection therebetween. The upper end of the chamber 12 is closed by a cap member 24 also mounted to the housing 10 by screws or the like (not shown) and engaging with an O-ring seal 26 to provide a fluid tight connection between the cap member 24 and the housing 10.

The inner wall section of the housing 10 which defines the chamber 12 is provided with an upper section 12A and a lower section 12B which are cylindrical and formed on substantially equal diameters. The sections 12A and 12B are separated by a wall section 12C of greater diameter than the sections 12A and 12B. Axially extending circumferentially spaced slots 28 and 30 are provided in the wall sections 12A and 12B respectively adjacent the juncture of these sections with the wall section 12C. The port 14 registers with the chamber 12 through the wall section 12A and the passage 18 registers with the chamber 12 through the wall section 12B.

A substantially cylindrical filter assembly 32 is axially slidably mounted within the chamber 12 by means of circular end caps 34 and 36 which are respectively axially slidably received in the wall sections 12A and 12B. The end cap 34 carries a piston ring 38 engaging the wall section 12A so that as the exterior surface of the end cap 34 moves along the wall section 12A the ring 38 insures that there is a fluid tight separation between the side sections of the chamber 12 on each side of the ring 38. Similarly the end cap 36 carries a piston ring 40 which engages the wall section 12B. A substantially cylindrical filter element 42 is disposed between the end caps 34 and 36 and is fixed thereto so that the end caps 34 and 36 and the filter element 42 moves axially together within the chamber 12.

The end cap 20 is provided with an outer hollow cylindrical boss section 44 provided with axially extending slots 46 and an inner hollow cylindrical boss section 48 disposed within the boss section 44 and extending into the chamber 12 a lesser axial distance than the boss section 44. A drain outlet 50 preferably opens to the interior of the hollow boss section 48 and a plug 52 is normally disposed within the drain outlet 50. A radially extending shoulder portion 54 is formed on the exterior surface of the boss section 48 and provides the seat for one end of a spring 56. The opposite end of the spring 56 engages the end cap 36 to urge the filter assembly 32 axially upwardly in the chamber 12.

The cap member 24 is provided with an annular recess 58 defined by an outer hollow cylindrical section 60 extending axially inwardly into the chamber 12 and an inner cylindrical portion 62 disposed within the section 60. The inner portion 62 extends axially inwardly into the chamber 12 a lesser distance than the outer section 60. The annular recess 58 forms a seat for one end of the spring 64. The opposite end of the spring seats against the upper portion of the end cap 34 to urge the filter assembly 32 axially downwardly in the chamber 12.

The end caps 34 and 36 of the filter assembly 32 are each provided with a central opening 66 and 68 respectively. A valve member 70 is dimensioned to extend into the opening 66 and is provided with an upper radially outwardly extending circular portion 72 which opens and closes the fluid flow through the opening 66 upon axial upward and downward movement of the valve 70 respectively. Similarly a valve 74 is provided for the opening 68 and is provided with a lower circular portion 76 which opens and closes fluid flow through the opening 68 upon downward and upward movement of the valve member 74 respectively. A rod 78 is fixed to the valve 70 and extends axially downwardly through the filter assembly 32 and through a central opening 80 provided in the valve 74. A spring retainer 82 is fixed to the free end of the rod 78 below the end cap 36 and provides the means for positioning a spring 88 between the retainer 82 and the valve member 74. It is apparent that the spring 88 directly urges the valve member 74 to a closed position and by urging the rod 78 axially downwardly in the chamber 12 also urges the valve 70 to a closed position.

Figure 1:
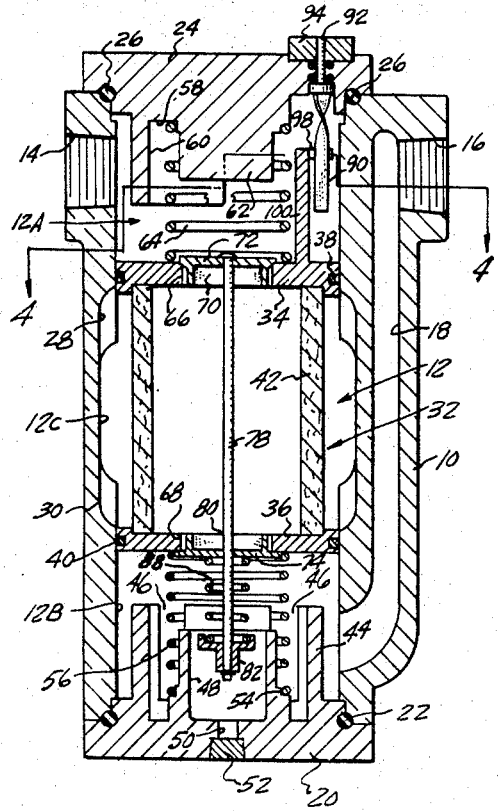
FIGURE 1 is a longitudinal cross-sectional view of the device of the present invention in a central position.
Figure 3:
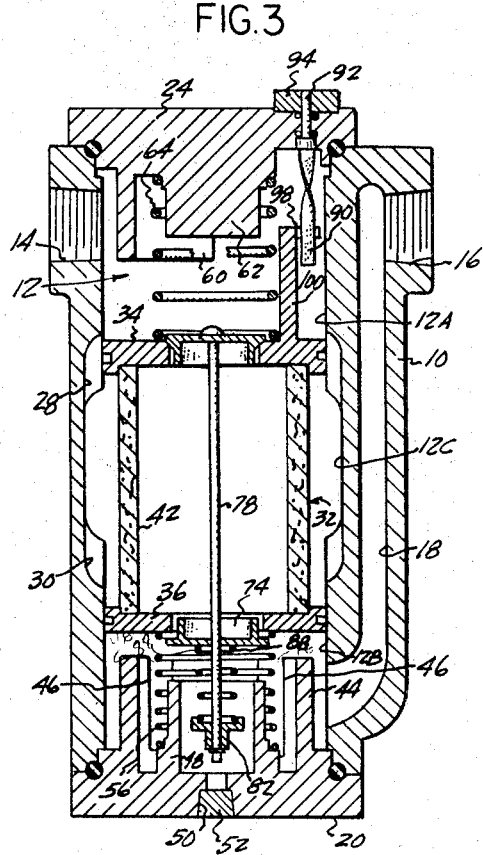
FIGURE 3 is a view similar to FIGURE 1 but illustrating the filter device when fluid is flowing through the device in a direction reversed to that of FIGURE 2.
Figure 4:
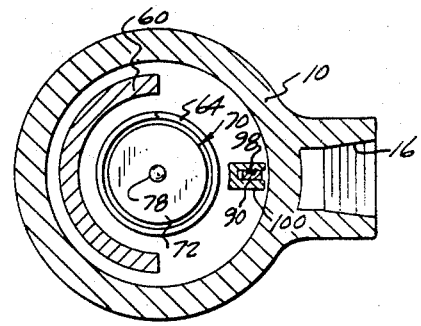
FIGURE 4 is a lateral cross-sectional view taken substantially on line 4—4 of FIGURE 1.
Figure 5:
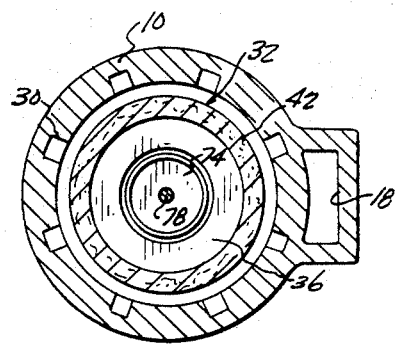
FIGURE 5 is a lateral cross-sectional view taken substantially on line 5—5 of FIGURE 2.
Figure 6:
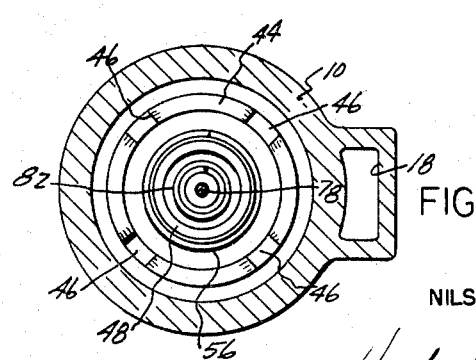
FIGURE 6 is a lateral cross-sectional view taken substantially on lines 6—6 of FIGURE 2.

As the invention has heretofore been described fluid entering the port 14 would fill the upper portion of the chamber 12 and would act upon the upper face of the end cap 34 to urge the filter assembly 32 from the normal or central position illustrated in FIGURE 1 toward the position illustrated in FIGURE 3. In this position the end cap 34 is moved axially past the grooves 28 to open a fluid path around the periphery of the end cap 34 and through the slots 28 to the exterior surface of the filter element 42. From there the fluid flows radially inwardly through the filter element where it is filtered and acts upon the interior surface of the valve member 74 to open that valve member against the force of the spring 88 and to permit the filtered fluid to flow through the section of the chamber 12 defined by the wall section 12B into the passage 18 and out the port 16.

Figure 2:
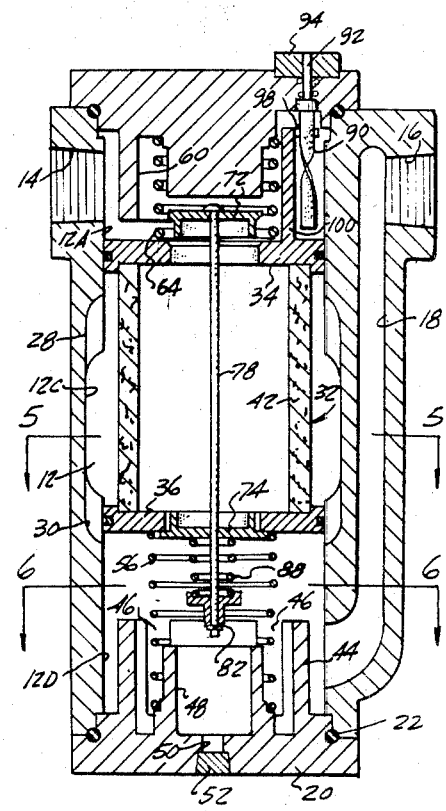
FIGURE 2 is a longitudinal cross-sectional view of the filter device of the present invention in one operating position thereof.

If the flow is now reversed in the system so that fluid is directed through the port 16 and exhausted from the port 14 the device will operate as follows. Fluid flowing through the port 16 will pass through the passage 18 and into the lower section of the chamber 12. The fluid acting on the lower surface of the end cap 36 will urge the filter assembly 32 axially upwardly in the chamber 12 toward the position shown in FIGURE 2. In this position, the end cap 36 will be above the lower end of the slots 30 so that fluid will flow around the ends of the end cap 36 through the slots 30 and radially inwardly through the filter element 42. The filtered fluid then will flow axially against the lower surface of the valve member 70 to urge the valve member 70 and the rod 78 to an upward position against the force of the spring 88 to thereby permit fluid to flow from the interior of the filter element 42 into the upper portion of the chamber 12 and out the port 14.

It is also apparent that as the invention has thus far been described a single filter element is utilized to perform the filtering function in a manner which retains the foreign particles filtered from the fluid on the exterior surface of the filter element regardless of which direction the fluid is flowing. Thus, regardless if the fluid flow is from port 14 to port 16 or from port 16 to port 14 the foreign particles will be trapped on the exterior surface of the filter element 42 and there is little chance for these particles to be again returned to the fluid system. The particular arrangement of the check valves 70 and 74 insures that the action which opens one will also urge the other toward a closed position so that there is no danger of back flow through the device upon opening of the appropriate check valve. The boss section 44 of the end cap 20 is dimensioned to engage the end cap 36 of the filter assembly 32 upon downward axial movement of the filter assembly 32 and to thereby act as a limit means for such movement. To insure that the check valve 74 will remain in an open position when the filter assembly has moved to this position the interior boss section 48 extends axially a lesser distance into the chamber 12 than the boss section 44 and the slots 46 are provided in the boss portion 44. The relative dimensions between the boss sections 60 and 62 of the end cap 24 are provided for the same reason. Since boss section 60 does not completely encompass the section 62 but is cut away in part no slots like slots 46 are needed.

As the filter element is used it will of course become clogged. This clogging will depend upon the amount of foreign particles removed from the fluid being filtered. In any event assuming that fluid flow is through the port 14 and out the port 16 so that the device is in the position illustrated in FIGURE 3, as the filter element 42 becomes clogged an increased pressure differential will be produced across the end cap 34 since the upper surface of the end cap 34 will be exposed to pressure on the inlet side of the filter element 42 and at least a portion of the inner surface of the end cap 34 will be subjected to pressure on the exterior side of the filter element 42. Since this pressure differential will vary depending upon the clogged degree of the filter element 42 and will increase as the clogged condition of the filter element 42 increases the filter assembly 32 will be moved continuously toward a lower extreme position as the element 42 continues to clog. Likewise with the port 16 directing fluid into the device and the port 14 being used to exhaust fluid from the device the filter assembly will tend to move toward an extreme upper position in the chamber 12 as the filter element becomes clogged. Assuming that the springs 56 and 64 exert an equal force and that the filter assembly 32 assumes the central position illustrated in FIGURE 1 when at rest the filter assembly 32 will assume positions equally spaced from the end of the chamber 12 as the fluid flow is reversed through the device. In other words, if the filter element is so clogged that the end cap 34 assumes a position against the boss section 60 when fluid is introduced through port 16 it will likewise assume a position in which the end cap 36 is against the boss section 44 when fluid is introduced through the port 14. Thus by providing an indicating means which accurately indicates the amount of deviation of the filter assembly 32 in both directions from some central position a means can be provided for indicating the clogged condition of the filter element 42 and which will be operable regardless of the direction of fluid flow through the device.

Such a means is provided in the present invention in the form of an elongated actuator element 90 which extends into the chamber 12 parallel to the axis of the filter assembly 32. The actuator element 90 has its upper end fixed to a shaft 92 rotatably mounted in the end cap 24 and which as can best be seen in FIGURE 7 is fixed at its exterior end to a pointer element 94. Pointer element 94 is associated with an indicator plate 96 having a central area bearing a legend indicating that the filter is clean and two sections on each side of the central section bearing a legend indicating that the filter needs cleaning. The actuator element 90 is formed of a flat strip of material having a uniform twist about its longitudinal axis and is carried in a transversely extending slot 98 formed at the free upper end of an arm member 100 joined to the upper surface of the end cap 34. The edges forming the slot 98 engage on the surfaces of the actuator element 90 so that axial movement of the filter assembly 32 moves the arm 100 axially along the actuator element 90 and causes the sides forming the slot 98 to engage the sides of the actuator element 90 to produce rotation thereof and rotation of the shaft 92 and the pointer element 94 which corresponds to the axial movement of the filter assembly 32. Thus, if the indicator element 94 is mounted to the shaft 92 in a position which points to the central area of the indicator plate 96 when the filter assembly 32 is in the central position then as the filter assembly 32 moves toward its upper limited position the pointer 94 will rotate to a position pointing to the legend that the filter element needs cleaning. Likewise if the filter element is clogged and fluid flow is directed through the port 14 to move the filter assembly to its lower limited position the pointer element 94 will be rotated clockwise to a position indicating that the filter element needs cleaning. With the filter assembly 32 in either of the positions of FIG. 2 or 3 the pointer 94 will of course be pointing to the central area of the indicator plate 96. The pointer 94 will point to the end portions of the indicator plate 96 only when the filter assembly 32 is in the extreme upper or lower position indicating that filter cleaning or replacement is necessary.

It is apparent that the present invention provides a fluid filter device which is capable of use in bidirectional systems and which has the advantage over heretofore known filter devices for such systems in that it utilizes a single filter element. In this way the cost of providing filtering in such a system is substantially diminished and a maximum filtering area can be achieved in a given space requirement. Further, indicating means have been provided which indicate the condition of the filter element regardless of the flow through the filter device.

It is also apparent that although a single embodiment of the present invention has been described many changes and modifications can be made therein without departing from the spirit of the invention as expressed by the scope of the appended claims.

I claim:
1. A filtering means for a bidirectional flow fluid system comprising a housing defining a chamber, a first port means and a second port means formed in said housing and opening to opposite ends of said chamber, a filter assembly including a filter element and means axially slidably mounting said filter assembly within said chamber intermediate said port means, means normally biasing said filter assembly to an intermediate position in said chamber and means moving said filter assembly against said biasing means in one direction in said chamber upon fluid flow from said first port means to said second port means and to an extreme position in said direction upon the pressure differential across said filter element reaching a predetermined value, and moving said filter assembly against said biasing means in an opposite direction in said chamber upon fluid flow from said second port means to said first port means and to a second extreme position in said opposite direction upon the pressure differential across said filter element reaching a predetermined value, valve means disposed within said filter assembly and actuated in response to movement of said filter assembly to direct fluid flow through said filter assembly in the same direction regardless of the direction of fluid flow through said filter device, and means connected with said filter assembly and operable to indicate the deviation of said filter assembly from said intermediate position to thereby indicate the direction of fluid flow in said system and the degree of clogging of said filter element.

2. The filter device as defined in claim 1 and in which said indicating means comprises:
   (a) an actuator element and means rotatably mounting said actuator element to extend into said chamber on an axis parallel to the axis of movement of said filter assembly,
   (b) said actuator element comprising a flat strip of material having a uniform twist about its longitudinal axis,
   (c) means provided on said filter assembly to engage the sides of said actuator element so that upon axial movement of said filter assembly a corresponding rotational movement of said actuator element is produced, and
   (d) pointer means carried on the exterior surface of said housing and connected with said actuator.

3. The filter device as defined in claim 1 and in which said valve means comprises:
   (a) a first check valve means mounted in said filter assembly intermediate the outlet side of said filter element and said first port means and operable upon a predetermined pressure differential across said first check valve means to open and thereby direct fluid from the outlet side of said filter element to said first port means, and
   (b) a second check valve means disposed between the outlet side of said filter element and said second port means and operable upon a predetermined pressure differential across said second check valve means to open and thereby direct fluid flow from the outlet side of said filter element to said second port means.

4. The filter device as defined in claim 1 and in which said filter assembly further comprises:
   (a) a pair of circular end caps axially slidably engaging the wall of said housing defining said chamber,
   (b) said filter element being cylindrical and carried intermediate said end caps, and
   (c) said valve means including slots formed in the wall of said housing defining said chamber to open fluid paths around said end caps upon predetermined axial positioning of said filter assembly.

5. The filter device as defined in claim 4 and including:
   (a) a first check valve means disposed in one of said end caps intermediate the outlet side of said filter element and said second port means and operable upon a predetermined pressure increase across said first check valve means to open and thereby direct fluid flow from the outlet side of said filter element to said second port means.

6. The filter device as defined in claim 5 and including means for indicating the position of said filter assembly exteriorly of said filter device.

References Cited
UNITED STATES PATENTS
3,244,282 4/1966 Rosaen _____ 210—90
3,289,841 12/1966 Quinting _____ 210—136 X SAMIH N. ZAHARNA, Primary Examiner U.S. Cl. X.R.

116—70; 210—91, 136